US012006729B2

(12) United States Patent
Sweeney et al.

(10) Patent No.: US 12,006,729 B2
(45) Date of Patent: Jun. 11, 2024

(54) LOCKING MECHANISM WITH STATUS INDICATOR

(71) Applicant: Sargent Manufacturing Company, New Haven, CT (US)

(72) Inventors: Ian Sweeney, North Haven, CT (US); Lee Griswold, Bethel, CT (US); Ryan Piantek, Higganum, CT (US)

(73) Assignee: Sargent Manufacturing Company, New Haven, CT (US)

( * ) Notice: Subject to any disclaimer, the term of this patent is extended or adjusted under 35 U.S.C. 154(b) by 0 days.

(21) Appl. No.: 17/939,331

(22) Filed: Sep. 7, 2022

(65) Prior Publication Data

US 2023/0041148 A1 Feb. 9, 2023

Related U.S. Application Data

(62) Division of application No. 16/270,838, filed on Feb. 8, 2019, now Pat. No. 11,486,163.

(60) Provisional application No. 62/677,866, filed on May 30, 2018.

(51) Int. Cl.

*E05B 41/00* (2006.01)
*E05B 15/02* (2006.01)
*E05B 65/00* (2006.01)

(52) U.S. Cl.

CPC .............. *E05B 41/00* (2013.01); *E05B 15/02* (2013.01); *E05Y 2900/132* (2013.01); *Y10S 292/61* (2013.01); *Y10T 292/0977* (2015.04)

(58) Field of Classification Search

CPC .. E05B 15/02; E05B 41/00; E05B 2015/0455; E05B 2015/0493; E05B 2015/0496; Y10S 292/61; Y10T 292/0977

See application file for complete search history.

(56) References Cited

U.S. PATENT DOCUMENTS 380,652 A * 4/1888 Gartside ................ E05B 41/00 40/907
391,215 A 10/1888 Vail
438,505 A * 10/1890 Tate ........................ E05B 41/00 40/907

(Continued)

FOREIGN PATENT DOCUMENTS

CA 2119798 A1 9/1995
FR 355225 A * 10/1905

(Continued)

OTHER PUBLICATIONS

Invitation to Pay Additional Fees for International Application No. PCT/US2019/017193, mailed Apr. 15, 2019.

(Continued)

*Primary Examiner* — Carlos Lugo
(74) *Attorney, Agent, or Firm* — Wolf, Greenfield & Sacks, P.C.

(57) ABSTRACT

A status indicator for a locking mechanism may include a status indicator face, a status indicator plate, a cam coupling, and a locking mechanism coupler. The status indicator face and status indicator plate may be at least partially moveable relative to one another. The locking mechanism coupler may have a greater rotational range of motion than the cam coupling. The status indicator face may indicate the state of a locking mechanism and may have a viewing angle greater than or equal to 180 degrees.

18 Claims, 16 Drawing Sheets

(56) References Cited

U.S. PATENT DOCUMENTS

| | | | | | |
|---|---|---|---|---|---|
| 689,429 | A | | 12/1901 | Smith | |
| 871,126 | A | | 11/1907 | Lockett | |
| 943,637 | A | | 12/1909 | Schoell | |
| 1,099,106 | A | | 6/1914 | Wevat | |
| 1,216,899 | A | | 2/1917 | Weyer | |
| 1,362,647 | A | * | 12/1920 | Stone | E05B 41/00 40/907 |
| 1,749,649 | A | | 3/1930 | Rolph | |
| 1,810,468 | A | * | 6/1931 | Doyle | E05B 41/00 70/433 |
| 2,315,102 | A | | 3/1943 | Adams | |
| 2,455,208 | A | | 11/1948 | Wirth | |
| 4,490,999 | A | | 1/1985 | Castle | |
| 4,559,796 | A | | 12/1985 | De Forrest, Sr. | |
| 4,607,510 | A | | 8/1986 | Shanaan et al. | |
| 4,746,155 | A | | 5/1988 | Hart | |
| 5,205,596 | A | | 4/1993 | Ralph | |
| 5,275,029 | A | | 1/1994 | Myers | |
| 5,658,026 | A | | 8/1997 | Nigro, Jr. et al. | |
| 6,932,486 | B1 | * | 8/2005 | Eller | E05B 15/02 362/100 |
| 6,938,445 | B2 | | 9/2005 | Huang | |
| 7,213,426 | B2 | | 5/2007 | Qing | |
| 7,290,808 | B2 | * | 11/2007 | Furlong | E05B 1/0015 292/357 |
| 7,552,954 | B2 | * | 6/2009 | Rozo | E05B 41/00 292/DIG. 31 |
| 7,571,694 | B2 | * | 8/2009 | Boerner | G08B 5/36 116/307 |
| 7,611,213 | B2 | | 11/2009 | Wu | |
| 7,699,365 | B2 | * | 4/2010 | Liang | E05C 3/046 292/DIG. 20 |
| 7,984,631 | B2 | * | 7/2011 | Case | E05B 15/02 D8/352 |
| 8,215,685 | B2 | | 7/2012 | Ellis | |
| 9,169,669 | B2 | | 10/2015 | Clary et al. | |
| 9,845,620 | B2 | | 12/2017 | Bronner | |
| 11,486,163 | B2 | | 11/2022 | Sweeney et al. | |
| 2002/0095957 | A1 | | 7/2002 | Bates et al. | |
| 2007/0214853 | A1 | | 9/2007 | Huang | |
| 2008/0289383 | A1 | | 11/2008 | Levine | |
| 2011/0016938 | A1 | | 1/2011 | Chi | |
| 2011/0167884 | A1 | | 7/2011 | Dumortier et al. | |
| 2011/0314876 | A1 | * | 12/2011 | Fang | E05B 53/00 70/91 |
| 2013/0269591 | A1 | | 10/2013 | Hosilyk | |
| 2014/0007631 | A1 | * | 1/2014 | Wood | E05B 63/044 70/357 |
| 2015/0240526 | A1 | | 8/2015 | Clary et al. | |
| 2015/0252592 | A1 | | 9/2015 | Tien | |
| 2018/0347229 | A1 | * | 12/2018 | Riley | E05B 3/06 |
| 2019/0368226 | A1 | | 12/2019 | Sweeney et al. | |

FOREIGN PATENT DOCUMENTS

| | | | | |
|---|---|---|---|---|
| FR | 0 500 300 | A | | 3/1920 |
| FR | 0 583 349 | A | | 1/1925 |
| FR | 0 674 662 | A | | 1/1930 |
| GB | 0 338 302 | A | | 11/1930 |
| GB | 1115501 | A | * | 5/1968 |
| GB | 1 182 845 | A | | 3/1970 |
| GB | 2 212 554 | A | | 7/1989 |
| GB | 2 322 902 | A | | 9/1998 |

OTHER PUBLICATIONS

International Search Report and Written Opinion for International Application No. PCT/US2019/017193, dated Jul. 9, 2019.

International Preliminary Report on Patentability for International Application No. PCT/US2019/017193, dated Dec. 10, 2020.

* cited by examiner

UNLOCKED
LOCKED
10
20
22
23
24
26
28
30
32
32a
32b
40
42
43
5

LOCKING MECHANISM WITH STATUS INDICATOR

RELATED APPLICATIONS

This application is a divisional of U.S. patent application Ser. No. 16/270,838, filed on Feb. 8, 2019, which claims the benefit under 35 U.S.C. § 119(e) to U.S. Provisional Application Ser. No. 62/677,866, filed on May 30, 2018, each of which is herein incorporated by reference in its entirety.

FIELD

Disclosed embodiments are related to a status indicator for a locking mechanism.

BACKGROUND

Conventional locking mechanisms with status indicators may use color coding and/or text to display whether the lock is engaged or disengaged to end users. These status indicators typically employ a small window located on the front or side face of the escutcheon plate encasing the locking mechanism.

SUMMARY

In some embodiments, a status indicator for a locking mechanism, the locking mechanism moveable between a locked state and an unlocked state, include an escutcheon plate having a curved front face portion, where the curvature of the front face portion includes at least two radii of curvature, an indicator window disposed on the front face portion of the escutcheon plate, and a status indicator disposed behind the escutcheon plate and visible through the indicator window. The status indicator displays a locked indication when the locking mechanism is in the locked state, and the status indicator displays an unlocked indication when the locking mechanism is in the unlocked state. The curvature of the of the front face portion allows the front face portion to be visible through the indicator window from a viewing angle greater than or equal to 180 degrees.

In some embodiments, a method of indicating the locking state of a locking mechanism includes displaying an unlocked indication when the locking mechanism is in an unlocked state, where the unlocked indication is displayed by a status indicator visible through an indicator window formed in an escutcheon plate, and wherein the escutcheon plate includes at least two radii of curvature, changing a state of the locking mechanism from the unlocked state to a locked state, and displaying a locked indication when the locking mechanism is in the locked state, where the locked indication is displayed by the status indicator visible through the indicator window.

In some embodiments, status indicator for a locking mechanism, the locking mechanism moveable between a locked state and an unlocked state, includes a status indicator face including a locked indication and an unlocked indication and a status indicator plate coupled to the locking mechanism. The status indicator plate is configured to move the status indicator face to display the locked indication when the locking mechanism is in the locked state, and the status indicator plate is configured to move the status indicator face to display the unlocked indication when the locking mechanism is in the unlocked state. The status indicator also includes a component configured to couple the status indicator face to the status indicator plate, where the component allows the status indicator face to be moved independently relative to the status indicator face.

In some embodiments, a status indicator for a locking mechanism, the locking mechanism moveable between a locked state and an unlocked state, includes a status indicator face including a locked indication and an unlocked indication, and a cam coupling configured to be coupled to the locking mechanism. The cam coupling is configured to cam the status indicator face to display the locked indication when the locking mechanism is moved to the locked state, and the cam coupling is configured to cam the status indicator face to display the unlocked indication when the locking mechanism is moved to the unlocked state. The status indicator also includes a locking mechanism coupler configured to rotate relative to the cam coupling, where a rotational range of motion of the locking mechanism coupler is greater than a cam coupling rotational range of motion.

In some embodiments, a status indicator for a locking mechanism capable of extending and retracting a portion of its escutcheon plate to better display the lock's engagement status to the public is provided.

In some embodiments, a status indicator for a locking mechanism that is easily viewable by an operator throughout multiple angles is provided.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figures 1, 2, 3, 4, 5:
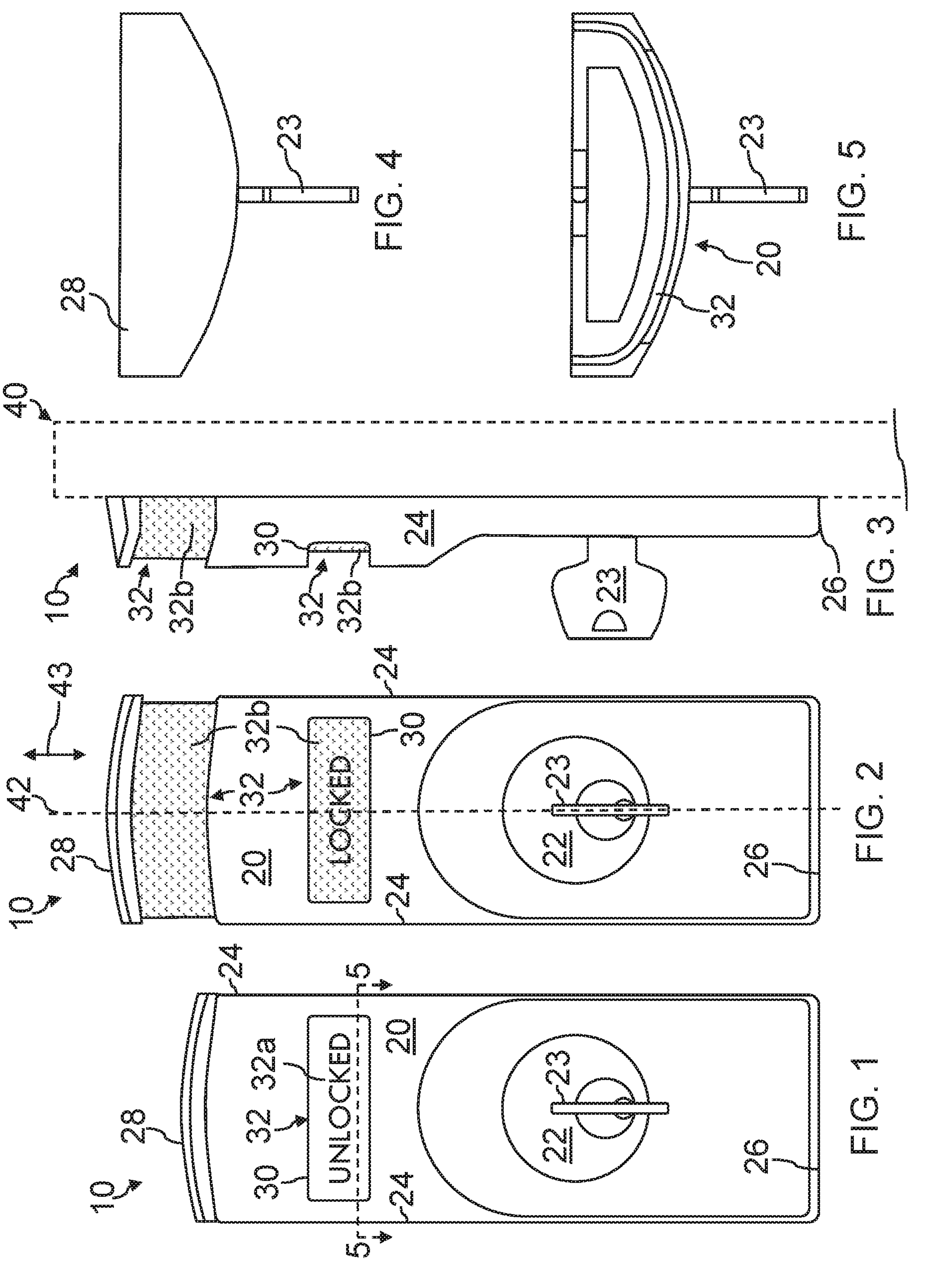
FIG. 1 is a front elevation view of one embodiment of a locking mechanism in an unlocked state and a status indicator displaying an "UNLOCKED" indication.
FIG. 2 is a front elevation view of the locking mechanism of FIG. 1 in a locked state and the status indicator of FIG. 1 displaying a "LOCKED" indication.
FIG. 3 is a side elevation view of the locking mechanism and status indicator of FIG. 1 disposed on a door with the locking mechanism in the locked state and the status indicator displaying a "LOCKED" indication.
FIG. 4 is a top plan view of the locking mechanism and status indicator of FIG. 1.
FIG. 5 is a top plan, cross-sectional view of the locking mechanism and status indicator of FIG. 1 taken along line 5-5 of FIG. 1.

Conventional status indicators for door locking mechanisms are typically minor, unobtrusive indicators which provide a subtle indication between locked and unlocked denotations. While in some installations a subtle indication is preferable, in other cases it may be desirable to provide a clear and easily noticeable indication as to the state of the door. For example, it may be desirable to provide clear indication as to the state of an exterior door handle in a classroom lockdown scenario. As another example, it may be desirable to provide external indication as to the occupancy of a restroom. When conventional indicators are employed in such situations, the indicator may be missed due to their characteristically small size and subtle change in indication between "LOCKED" and "UNLOCKED" denotations.

In view of the above, the inventors have recognized the benefits of a locking mechanism with a status indicator which provides a clear indication as to a state of the locking mechanism. The status indicator may be viewable from multiple angles and may induce one or more noticeable characteristic changes of the locking mechanism such as text change, color change, shape change, size change, or a combination of any suitable characteristics. Such an arrangement may improve the operation of the locking mechanism by providing reliable feedback to an operator of the locking mechanism.

Conventional status indicators are also typically designed and implemented for specific locking mechanism hardware. That is, for a particular locking mechanism including a specific process of operating the locking mechanism, a status indicator may be employed with hardware tied to that particular locking mechanism. Some particular locking mechanisms may include components which have a desirable range of motion that exceeding that allowed by conventional status indicators. For example, a status indicator for a mortise deadbolt lock may be incompatible with a mortise lock which allows a user to unlock a deadbolt and retract a latch bolt by overturning a key or thumb turn. Thus, a greater range of motion of a lock cylinder, thumb turn, or handle which may be used to enable the latch bolt retraction (or other desirable functions) may be blocked by a limited range of motion of a status indicator not specific to that locking mechanism. Accordingly, a conventional status indicator may not be retrofitted or used in other non-specific locking mechanisms, and significant cost and complexity is introduced by providing specific status indicators for many different locking mechanisms that have different ranges of desirable motion.

In view of the above, the inventors have recognized the benefits of an overrunning cam coupling for a status indicator which may allow a status indicator to be employed with different locking mechanisms by allowing additional range of motion for various locking mechanism components coupled to the status indicator. That is, the overrunning cam coupling may allow for a greater range of travel for locking mechanism hardware while ensuring the status indicator reliably changes between states.

In some cases, conventional status indicators may be directly coupled to a locking mechanism so that the status indicator changes states to correspond to a locking mechanism state change. Due the coupling between the status indicator and the locking mechanism, the indicator may sometimes be used to manipulate internal locking hardware of the locking mechanism. That is, manipulation of conventional status indicators may compromise the security of the locking mechanism.

In view of the above, the inventors have recognized the benefits of a status indicator which is indirectly coupled to a locking mechanism. For example, the status indicator may be coupled to the locking mechanism through one or more components which allow the status indicator to be manipulated by the locking mechanism, but inhibit the locking mechanism from being manipulated by the status indicator. Such an arrangement may improve security of a locking mechanism and also provide increased vandalism resistance.

In some embodiments, a status indicator for a locking mechanism includes a status indicator face, a status indicator plate, and a cam coupling. The status indicator face and the status indicator plate may be configured to translate linearly between a first (e.g., retracted, lower, etc.) state and a second (e.g., extended, upper, etc.) state. The status indicator face and status indicator plate may be linked by a component, such as a biasing element as will be explained below, which supports and allows the status indicator plate to move the status indicator face, but inhibits the status indicator face from moving the status indicator plate. The cam coupling may be employed such that any desirable rotational motion of the locking mechanism (e.g., handle turn, deadbolt turn, lock cylinder turn, key turn, etc.) may be used to move the status indicator plate. The cam coupling may be coupled to a cam slot disposed in the status indicator plate so that rotation of the cam coupling translates the status indicator plate. In some embodiments, hardware in the locking mechanism connected to the cam coupling may be angularly displaceable to an extent which may otherwise be inhibited by the cam coupling and the status indicator plate. That is, a range of motion of hardware in the locking mechanism may be limited by the range of motion of the status indicator via the cam coupling. Thus, in some cases is may be desirable to increase the range of motion afforded to various components of the locking mechanism by the status indicator. Accordingly, in some embodiments, the cam coupling may also include a cam biasing member or other suitable component which partially decouples the motion of locking mechanism components and the status indicator plate so that the hardware in the locking mechanism is afforded a greater range of motion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 6:
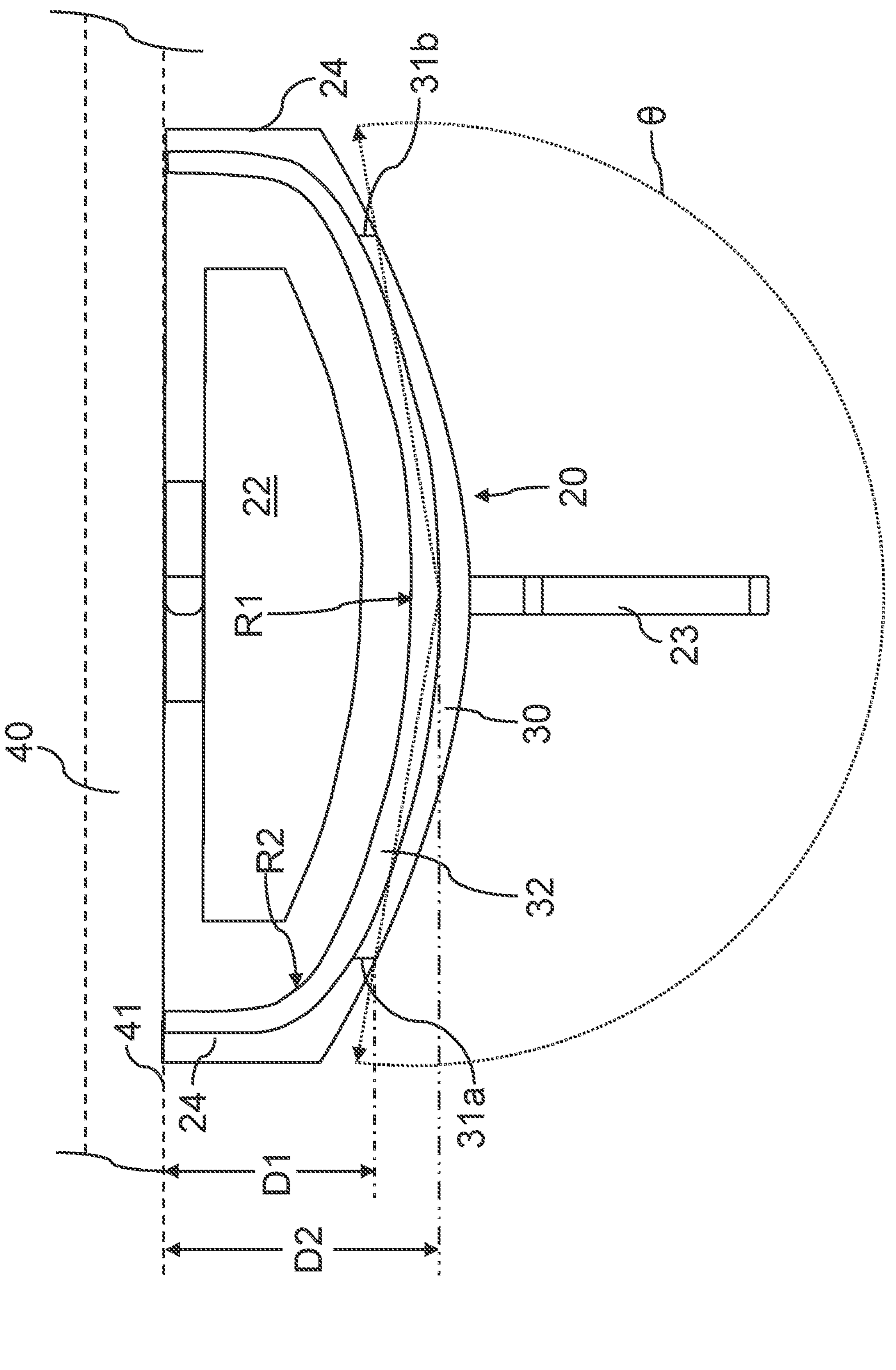
FIG. 6 is the top-down, cross-sectional view of the locking mechanism and status indicator of FIG. 5 expanded to show a curvature of the status indicator.

FIG. 1 depicts one embodiment of a locking mechanism 10 which includes an escutcheon plate 20 (i.e., housing) having an indicator window 30 disposed on its front face substantially near the center of the escutcheon plate 20. The locking mechanism 10 may be disposed on a planar face 41 of a door 40 or other structure/panel (e.g., a window) compatible with locking mechanisms, as shown in FIG. 3. As shown in FIGS. 1-2, the perimeter of the escutcheon plate 20 may take the shape of a rectangle, with substantially parallel sides 24 on opposite sides thereof and a planar bottom 26 with a partially rounded top 28. Of course, the escutcheon plate may have any suitable shape, including, but not limited to, circular, ovoid, trapezoidal, and square shapes. The front face of escutcheon plate 20 is smoothly curved along its length between the sides 24, the curvature employing multiple radii as it extends across parallel sides 24 as best shown in FIGS. 5-6. Window 30 is disposed on the smoothly curved front face of escutcheon plate 20. Window 30 does not extend to the sides 24, which are outward and on either side of window 30. In the embodiment shown in FIGS. 1-3, window 30 is rectangular, with a width greater than the height, and the entire front face portion of escutcheon 20 is smoothly curved between the sides 24.

As shown in FIGS. 1-2, disposed behind escutcheon plate 20 is a slidable status indicator 32 (e.g., status indicator face) that is visible through the window 30, and which provides color and/or word indications denoting whether the locking mechanism 10 is in an unlocked state (denoted by "UNLOCKED" indication 32*a*) or locked state (denoted by "LOCKED" indication 32*b*). In some cases, it may be desirable to increase the viewing angle of the status indicator so that the status of the door may be ascertained from multiple angular positions in a room. Accordingly, as shown in the embodiment of FIGS. 1-2, the status indicator 32 is smoothly curved in conformity with the front face of escutcheon plate 20, having multiple radii R1, R2 along its curvature and meeting the door 40 plane 41 at a substantially 45°-90° angle, as shown in FIG. 6. The curvature of the status indicator and escutcheon plate may allow the status indicator to be seen from a wide viewing angle, as the indicator is not blocked from view by the parallel sides 24 at wide viewing angles, as will be discussed further below with reference to FIG. 6. While the radius of curvature is constant in terms of what is visible through window 30 in the embodiments shown, the radius of the visible portion of the indicator 32 may be variable and smoothly change over a length of the visible portion. The angle of view of status indicator 32 (as further described below with reference to FIG. 6) is based on the radius of curvature of the escutcheon 20 face and indicator 32. Such radius may typically range from about 4-20 inches, although other values are contemplated, and the present disclosure is not so limited.

As shown in FIGS. 1-3, the status indicator 32 may be upwardly extendable from within the escutcheon plate 20, which, when extended, displays further color, text, or other suitable indication 32*b* denoting that the locking mechanism 10 is in the locked state as shown in FIG. 2. In the alternative, such extension may instead be used to indicate that locking mechanism 10 is in the unlocked state. In some embodiments, the extension may be configurable by the operator to indicate a desired state of the locking mechanism. According to the present embodiment, the extension of the "LOCKED" indication 32*b* is adjacent and beneath the top portion 28 of escutcheon plate 20, and is extendable/retractable along a longitudinal (e.g., vertical) axis 42 of the escutcheon plate 20 when the locking mechanism 10 is moved from the unlocked state to the locked state (as indicated by arrows 43 shown in FIG. 2). When the status indicator is in an extended state, the indication provided may be highly visible because the shape of the locking mechanism and status indicator is changed. That is, in the present embodiment, the overall length of the locking mechanism and status indicator is increased, so that the locked state may be easily perceived at a distance. Of course, any suitable shape change or size change may be employed to indicate a state of a locking mechanism, including, but not limited to, increasing or decreasing overall principle dimensions (e.g., length, width, thickness). These unlocked and locked states (denoted by "UNLOCKED" and "LOCKED" indications 32*a*, 32*b*) may also be indicated by a combination of colors and words denoting such, as demonstrated in FIGS. 1-2. The lock status of locking mechanism 10 may otherwise be indicated using any combination of color coding, words (other than "LOCKED/UNLOCKED"), lights, patterns, symbols, images, textures (e.g. braille), luminance (e.g., reflectivity), and/or any other suitable indication. Indicator 32 may be translatable to display either "UNLOCKED" or "LOCKED" indications 32*a*, 32*b* through movement of an internal piece of a drive mechanism 22, such as a piece connected to movement of a deadbolt to lock or unlock the door, or may be slid independently by some other mechanism to present the status 32*a*, 32*b* desired by the operator, as will be discussed further with reference to FIGS. 9-18.

As shown in FIGS. 1-3, a lock cylinder 22 (e.g., drive mechanism, actuator, etc.) which is engageable with a key 23 is visible on the outer face of the escutcheon plate 20 substantially centered about longitudinal axis 42 and extending through the escutcheon 20. According to the embodiment of FIGS. 1-6, the engagement of drive mechanism 22 correlates with the extendable status indicator 32, such that when the key 23 is turned in one direction the status indicator 32 displays the "UNLOCKED" indication 32*a*, and when key 23 is turned in the opposite direction the "LOCKED" indication 32*b* is displayed and the indicator 32 further extends upwards 43 along longitudinal axis 42. In some embodiments, a thumb turn (not shown) may be used in place of or in conjunction with the key 23. According to this embodiment, the interactions between the drive mechanism 22, thumb turn and status indicator 32 may be substantially the same to that of the drive mechanism and key combination. In a further alternative, the drive mechanism 22 may be controlled electronically or by another manually moveable lock member.

As shown in FIG. 6, the central portion of status indicator 32 extends outward from the plane 41 of the door 40 face on which the locking mechanism 10 is installed, as shown in phantom lines in FIG. 6. Escutcheon plate 20 is mounted a distance D2 greater than an indicator window distance D1, so that at least a portion of the indicator plate 32 is visible through the window 30 from a location close to or along the plane 41 of the door 40 adjacent the escutcheon 20. Although the escutcheon plate side edge walls 24 may have a desired depth, the curvature of the face minimizes the depth of the side edge walls while permitting an observer to see the status indication 32*a*, 32*b* on the indicator 32 from a wide angle of view, up to or greater than 180°. That is, because the escutcheon and status indicator each have curvature and protrude out from a door, the distal most portion of the status indicator curve may be visible from a viewing angle greater than or equal to 180°. Put another away, if D2 is greater than D1, the status indicator will be visible from a viewing angle of at least 180°. Accordingly, the curvature of the status indicator and escutcheon may be selected to alter the difference between D1 and D2 to increase or reduce the viewing angle, θ, to any desirable angle. In some embodiments, the side edge wall depth may be minimized to further increase the viewing angle and such minimization may also reduce the interference of the escutcheon to side-to-side movement, so that objects slid over the escutcheon (inadvertently or not) are less likely to be hung up by the escutcheon.

As discussed above and shown in FIG. 6, the status indicator 32 is viewable from a wide angle as a result of the multiple radii of curvature of the status indicator. That is, the rectangular window 30 cut into the escutcheon plate 20 allows the curved status indicator to be seen at angles greater than or equal to 180 degrees. The viewing angle, θ, is based on the first radius of curvature R1 and the width of the window cut in the escutcheon plate. In particular, so long as the first radius of curvature R1 is appropriately small so that the status indicator projects outside a plane defined by lateral edges of the window opening 31*a*, 31*b*, the status indicator will have a viewing angle greater than or equal to 180 degrees. According to the embodiment shown in FIG. 6, the viewing angle, θ, for the status indicator is between 180 and 200°. Such an arrangement may be beneficial to indicating a locking mechanism status through a door window or at least semi-transparent door. Of course, any suitable viewing angle may be employed, as the present disclosure is not so limited.

Figure 7:
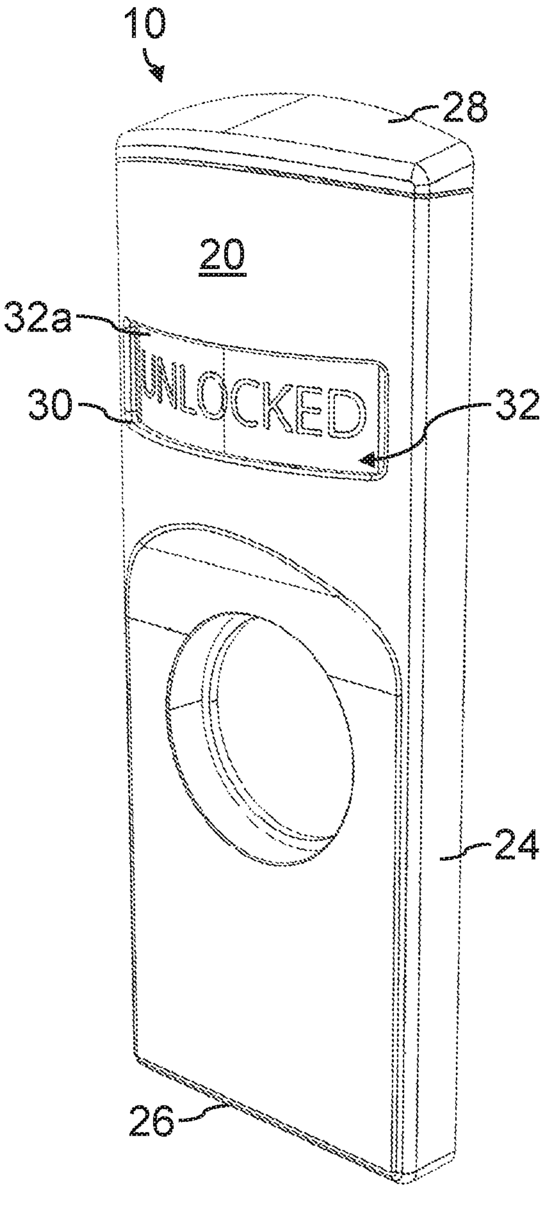
FIG. 7 is a perspective view of the locking mechanism and status indicator of FIG. 1.
Figure 8:
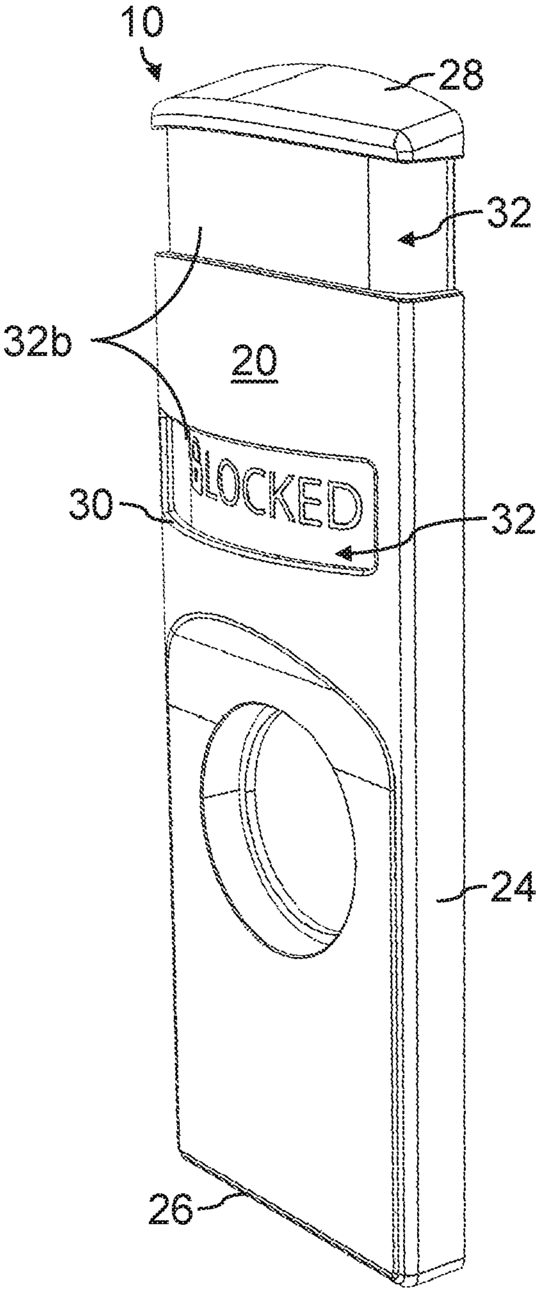
FIG. 8 is a perspective view of the locking mechanism and status indicator of FIG. 2.

FIGS. 7 and 8 depict perspective views of the status indicator of FIGS. 1-6 displaying an "UNLOCKED" indication 32*a* and "LOCKED" indication 32*b*, respectively. In FIG. 7, the status indicator is in the retracted state, with the top portion 28 flush with the escutcheon plate 20 and "UNLOCKED" displaying through the indicator window 30. In this state, the status indicator may display a muted green color or other color associated with free motion through an entryway. In FIG. 8, the status indicator 32 is in the extended state with the top portion 28 separated from the escutcheon plate by the status indicator. A "LOCKED" indication 32*b* displays on the status indicator, and the status indicator may also display a bright red color or other color associated with restricted motion through an entryway. In some embodiments, the "LOCKED" indication 32*b* includes retroreflective coatings (i.e., light incident on the status indicator is reflected) or other attention grabbing colors, patterns, textures, or luminescent coatings that may increase the visibility of the status indicator. Additionally, as shown in FIG. 8, the overall length of the status indicator has been increased as the top portion 28 has been extended away from the escutcheon plate, further providing clear indication to an operator of an associated locking mechanism.

Figure 9:
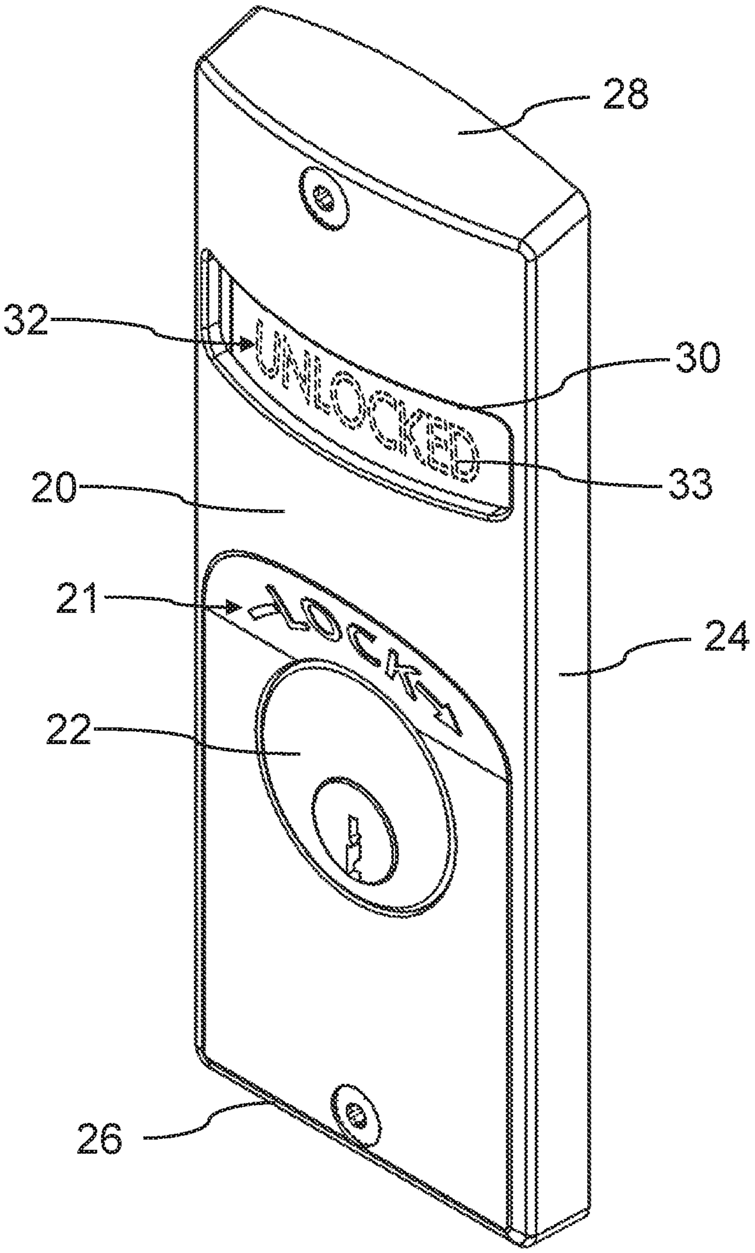
FIG. 9 is a perspective view of another embodiment of locking mechanism in an unlocked state and status indicator displaying an "UNLOCKED" indication.

FIG. 9 is a perspective view of another embodiment of a locking mechanism and status indicator 32. According to the embodiment shown in FIG. 9, the status indicator includes a curved escutcheon plate 20 (i.e., housing) having parallel sides 24 similar to the embodiment of FIGS. 1-8. The status indicator also includes a bottom portion 26 and a top portion 28. In contrast to the embodiment of FIGS. 1-8, the status indicator of FIG. 9 does not include an extending portion of the status indicator and the status indicator correspondingly retains the same size and shape regardless of the state of the status indicator and/or locking mechanism. Instead, the status indicator includes a status indicator face 33 which is visible through an indicator window 30 formed in the escutcheon plate. The status indicator face is configured to slide inside the escutcheon plate along a longitudinal axis of the status indicator and locking mechanism so that a locked state or unlocked state of the locking mechanism may be displayed. According to the embodiment of FIG. 9, the locking mechanism may be manipulated with a lock cylinder 22 with a key (not shown in the figure). The locking mechanism and status indicator also includes a static lock cylinder indicator 21 which denotes a direction to turn the key in the lock cylinder to lock the locking mechanism, which in this case is a clockwise rotation of the key relative to the lock cylinder.

Figure 9A:
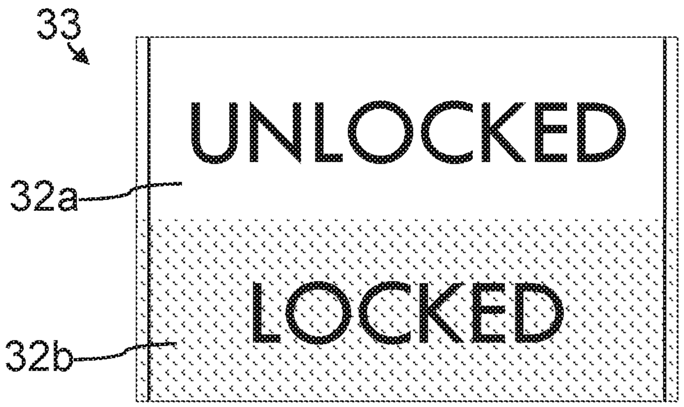
FIG. 9A is a front elevation view of one embodiment of a status indicator face.
Figure 9B:
FIG. 9B is a front elevation view of yet another embodiment of a status indicator face.
Figure 9C:
FIG. 9C is a front elevation view of yet another embodiment of a status indicator face.

FIGS. 9A-9C depict various embodiments of a status indicator face 33 which may be used to display an indication of a locking mechanism state. FIG. 9A shows one embodiment corresponding to the status indicators described previously in exemplary embodiments here. A first indication 32*a* reads "UNLOCKED" and a second indication 32*b* reads "LOCKED". The second indication also includes a pattern, color, or retroreflective coating which catches attention more easily by reflecting light incident on the status indicator face. Of course, the pattern, color, or retroreflective coating may be reverse or included on both indications, as the present disclosure is not so limited. FIG. 9B shows another embodiment which may be employed for a bathroom where the indication is provided to an unsecured space. The first indication 32*a* reads "VACANT" and the second indication 32*b* reads "OCCUPIED" which may allow an operator to recognize quickly and easily whether a restroom is being used. FIG. 9C shows yet another embodiment in which the first indication 32*a* reads "OPEN" and the second indication 32*b* reads "SAFE". Such an arrangement may be beneficial in school or commercial buildings where lockdown procedures occur to encourage best security practices. In some embodiments, the order of the first indication and second indication may be reversed depending on a particular locking mechanism. In some embodiments, more than two indications may be employed corresponding to multiple states of a locking mechanism. For example, a first indication may read "UNLOCKED", a second indication may read "HANDLE LOCKED", and a third indication may read "DEADBOLT LOCKED", each of which corresponds to a particular security state of the locking mechanism. Of course, any suitable colors, text, images, patterns, symbols, textures, and/or luminance may be employed.

Figure 10:
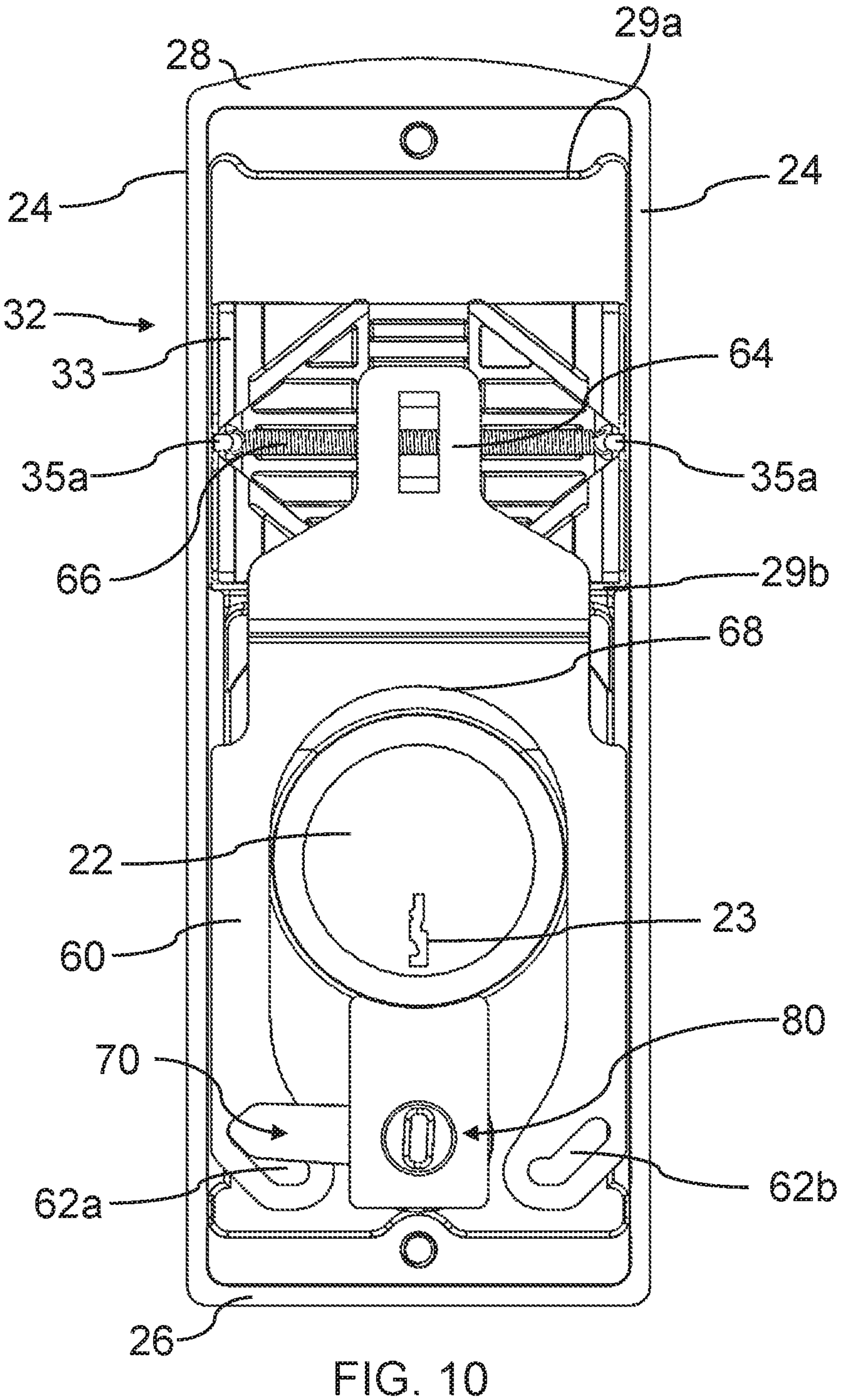
FIG. 10 is a rear elevation view of one embodiment of the locking mechanism and status indicator of FIG. 9.

FIG. 10 is a rear elevation view of the locking mechanism and status indicator 32 of FIG. 9 showing the mechanical elements of the status indicator. As shown in FIG. 10, the status indicator face 33 is disposed between the sides 24 of the escutcheon plate. The status indicator face includes at least two indicators (e.g., a "LOCKED" indication and an "UNLOCKED" indication) which fill an indicator window formed in the escutcheon plate (see FIG. 9). The status indicator face slides between longitudinal (i.e., vertical)

positions within the escutcheon plate corresponding to each of the indications. The status indicator face is indirectly coupled to a status indicator plate 60 by a suitable component, such as a biasing element 66, so that sliding movement of the status indicator plate moves the status indicator face. The status indicator plat includes a lock cylinder cutout 68 which allows the status indicator plate to slide around the lock cylinder 22 or other locking hardware implemented with the locking mechanism. The status indicator plate includes a first cam slot 62*a* and a second cam slot 62*b*. According to the embodiment of FIG. 10, only the first cam slot 62*a* is coupled to a cam coupling 70 and allows rotational motion of the cam coupling to translate the status indicator plate between longitudinal positions. The second cam slot 62*b* allows for a reversed locking direction and/or a reversal of the direction of movement of the status indicator plate when the locking mechanism is moved between locked and unlocked states, both of which may be beneficial in left handed locking mechanism installations and right handed locking mechanism installations. The first cam slot and second cam slot may be used independently or in combination to manipulate the status indicator plate. The cam coupling is coupled to a locking mechanism coupler 80 which transmits rotational motion of the locking mechanism (e.g., the lock cylinder) to the cam coupling. Thus, the status indicator face, status indicator plate, cam coupling, and locking mechanism coupler may allow a status indicator to be moved reliably to display "LOCKED" or "UNLOCKED" indications (or some other suitable indication) depending on the state of the locking mechanism.

Figure 10A:
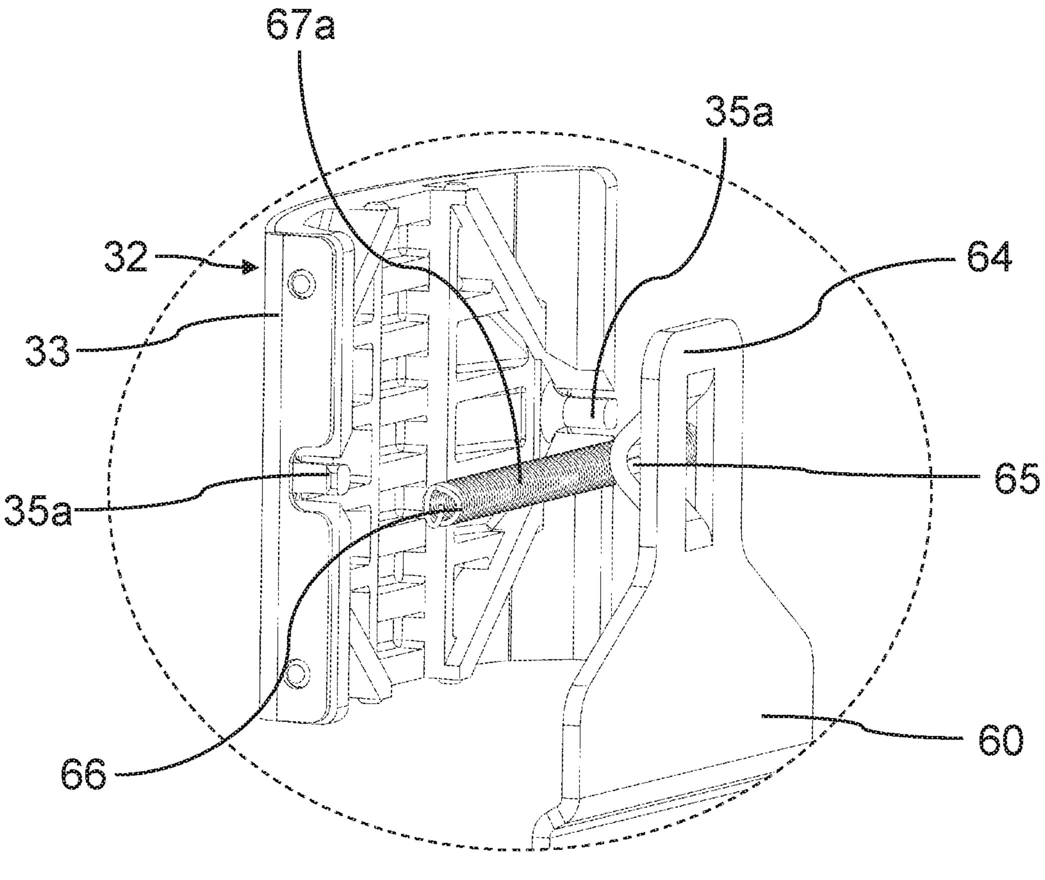
FIG. 10A is an enhanced exploded view of the status indicator of FIG. 10.

According to the embodiment shown in FIG. 10 and enhanced exploded view FIG. 10A, the biasing element 66 is configured as an extension spring connected at each end to first and second spring connection points 35*a*, 35*b* disposed on the status indicator face. A center portion 67*a* of the extension spring is disposed inside a plate coupling portion 64 of the status indicator plate. In particular, as shown in the enhanced exploded view of FIG. 10A, the center portion of the extension spring is held in a through hole projection 65 formed in the plate coupling portion 64. A spring constant of the biasing element may be selected to that the biasing element supports the weight of the status indicator face against the force of gravity and/or any frictional forces from the escutcheon plate so that the status indicator face may be reliably moved to display the different indicators. The spring constant may also be selected so that forces applied directly to the status indicator face (e.g., during vandalism or forced entry attempts) are not significantly transmitted to the status indicator plate. That is, the status indicator face will move independently as an external force is applied, and, due to a low spring constant, insignificant amounts of force will be transmitted to the status indicator plate even if the status indicator face is moved to the extremes of the status indicator's range of motion. Once the force on the status indicator face is released, the biasing element moves the status indicator face back into its correct position based on the set position of the status indicator plate. Of course, while an extension spring is shown in FIGS. 10 and 10A, any suitable biasing member may be employed to couple the status indicator face to the status indicator plate, including compression springs and torsion springs, as the present disclosure is not so limited. Additionally, in some embodiments, other suitable components such as linkages, gears, or cams which may be biased or unbiased may be used to at least partially decouple the motion of the status indicator face and the status indicator plate to increase resilience to vandalism and/or force entry attempts, as the present disclosure is not so limited.

Figure 10B:
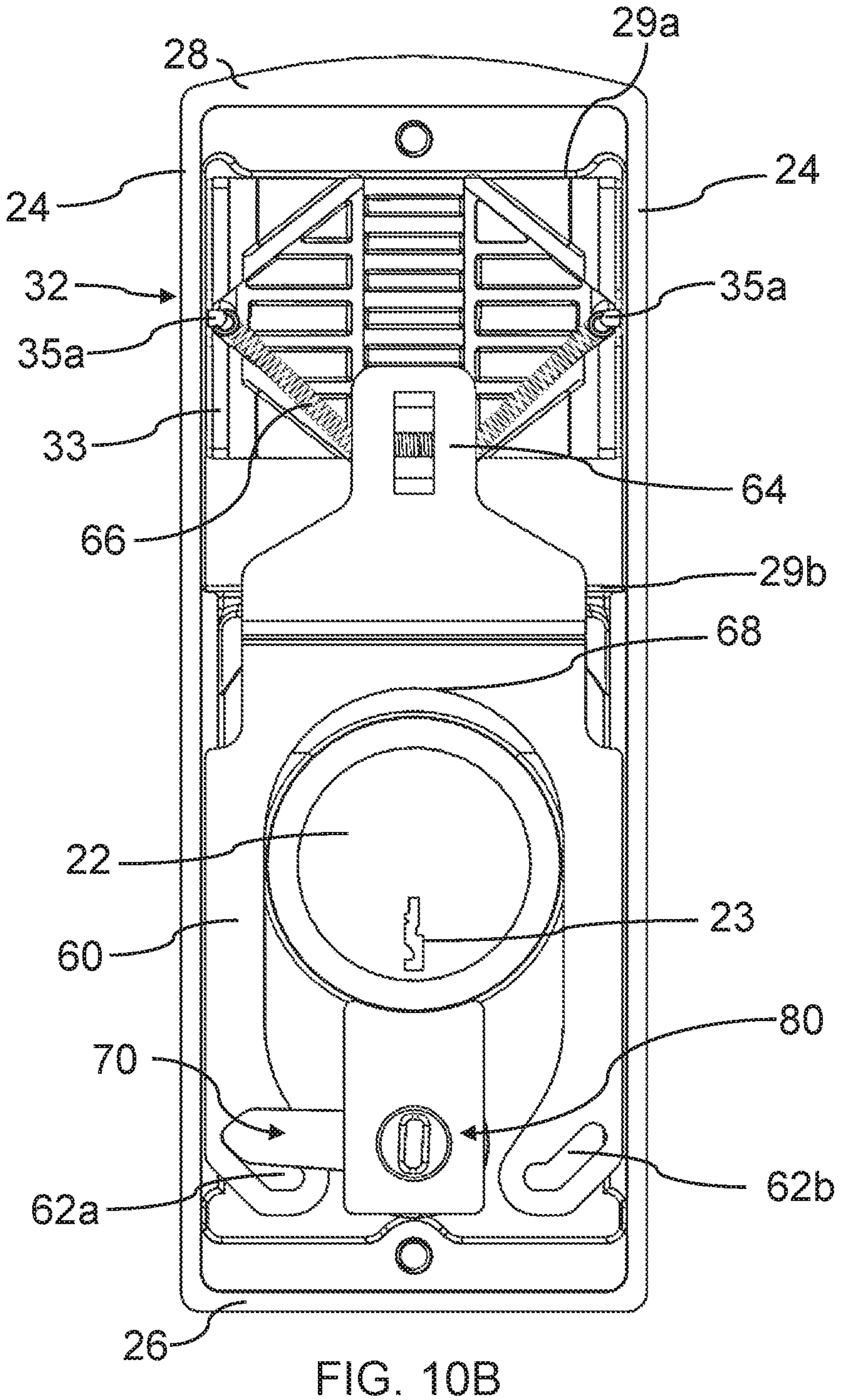
FIG. 10B is a rear elevation view of the locking mechanism and status indicator of FIG. 10 with an external force being applied to a status indicator face.

FIG. 10B depicts the status indicator of FIGS. 10 and 10A with an external force applied to the status indicator face 33 so that the status indicator face is in an independent position relative to the status indicator plate 60. As shown in FIG. 10B, the status indicator plate is in a position corresponding to an unlocked state of an associated locking mechanism. However, the status indicator face 33 is in a position corresponding to displaying a "LOCKED" indication. That is, external force has been applied to the status indicator face to move the status indicator face independently of the status indicator plate. Accordingly, the biasing member 66 is under spring tension and applies a biasing force which urges the status indicator face back to the correct position shown in FIG. 10. The correct position of the status indicator face is based on the position of the status indicator plate which is moved in conjunction with an associated locking mechanism. As discussed previously, the spring constant of the biasing member is selected so that a suitable amount of biasing force is applied to the status indicator face when the external force is removed. The spring constant is also selected such that insignificant force is applied to the status indicator plate when an external force is applied to the status indicator face so that locking mechanism may not be manipulated with the status indicator face. When the status indicator is released, the status indicator face will return to the correct position shown in FIG. 10 (i.e., move down relative to the page) so that the status indicator face displays an "UNLOCKED" indication to correspond with the state of the associated locking mechanism.

In addition to improving resilience to vandalism and/or force entry attempts, the biasing member 66 may also be used to reliably set the height of the status indicator face 33 for a variety of different escutcheon plate sizes and shapes, as shown in FIG. 10. As shown in FIG. 10, the escutcheon plate or other housing may include a first indicator stop 29*a* and a second indicator stop 29*b* which correspond to positions where the status indicator face is displaying a first indication (e.g., a "LOCKED" indication) and a second indication (e.g., an "UNLOCKED" indication). The first and second indicator stops may be formed as ledges in the escutcheon plate, or may be any suitable projection which contacts the status indicator face as it slides to the extremes of a status indicator face range of motion. That is, a range of motion of the status indicator face is limited by the stops 29*a*, 29*b*, in contrast to the status indicator plate which is limited by the cam coupling, but not specific stops on the escutcheon plate. Thus, in some embodiments, a range of linear motion of the status indicator plate 60 may be greater than that of a status indicator face because the biasing element allows for independent movement of the status indicator plate and status indicator face. For example, when the status indicator is moved to display a first indicator, the status indicator face may be stopped (e.g., at first stop 29*a*) in a first direction as a status indicator plate continues to move in the first direction and the biasing element expands. Similarly, the status indicator may be stopped in a second direction (e.g., at second stop 29*b*) to display a second indicator as the status indicator plate continues to move in the second direction and the biasing element expands. Thus the biasing element allows for a disparity in movement ranges between the status indicator face and status indicator plate without damaging or degrading either component, and may allow use of a single status indicator face and plate across multiple locking devices where the range of motion of the status indicator face may be altered for mechanical or aesthetic reasons.

Figure 11:
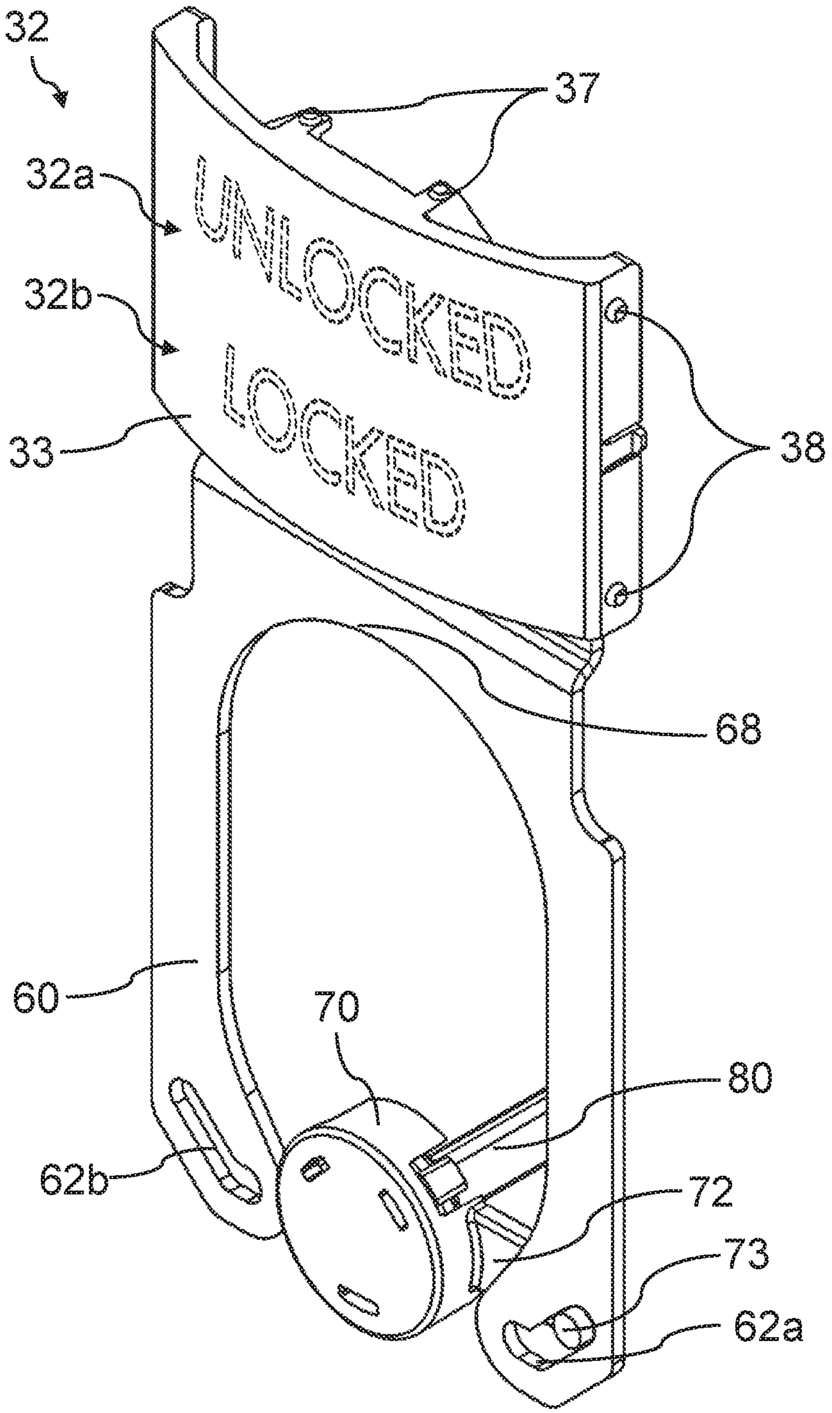
FIG. 11 is a perspective view of the status indicator of FIG. 10 including a "LOCKED" indication and an "UNLOCKED" indication.

FIG. 11 is a perspective view of the status indicator 32 of FIG. 10 isolated from the escutcheon plate. As shown in FIG. 11 and discussed previously, a status indicator face 33 is coupled to a status indicator plate 60 which in turn is coupled to a cam coupling 70. The cam coupling is coupled to the status indicator plate via a cam pin 73 which is disposed on cam arm 72 and projects through the first cam slot 62*a*. Accordingly, rotational motion of the cam coupling (e.g., via rotational force from a locking mechanism transmitted through locking mechanism coupler 80) will translate the status indicator plate along a longitudinal axis of the status indicator. As shown in FIG. 11, the status indicator face 33 includes longitudinal stops 37 and sliding spacers 38. Without wishing to be bound by theory, the status indicator face may undergo a significant number of wear cycles sliding back and forth inside the escutcheon plate. Accordingly, the longitudinal stops and sliding spacers which project from the status indicator face may be used as contact points for the status indicator and are built up to withstand repeated frictional or impact forces which may otherwise wear down the status indicator face. Additionally, the longitudinal stops and sliding spacers may reduce the friction and improve the smoothness of the sliding transition between displaying different locking indications.

Figure 12:
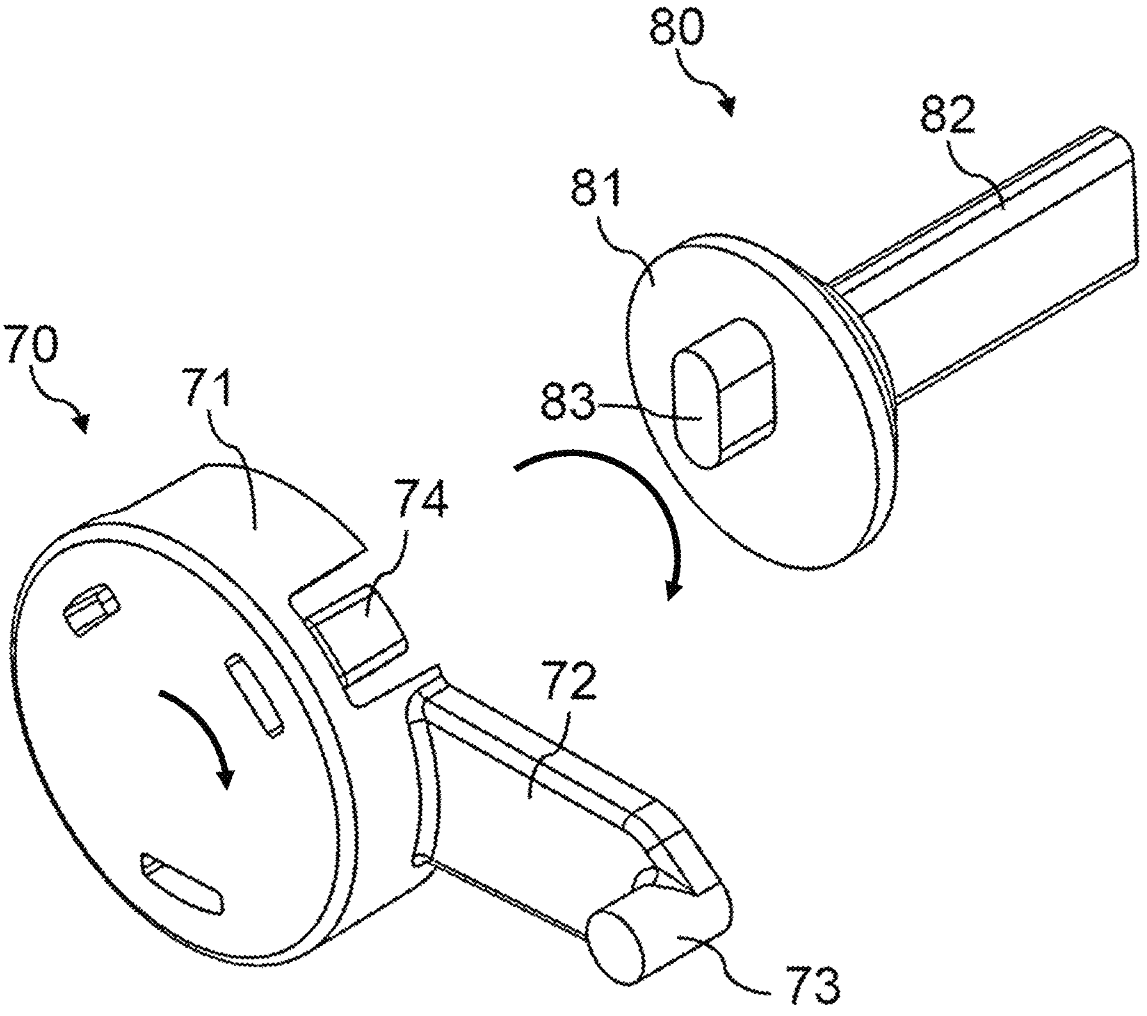
FIG. 12 is a perspective exploded view of one embodiment of an overrunning cam coupling.
Figure 13:
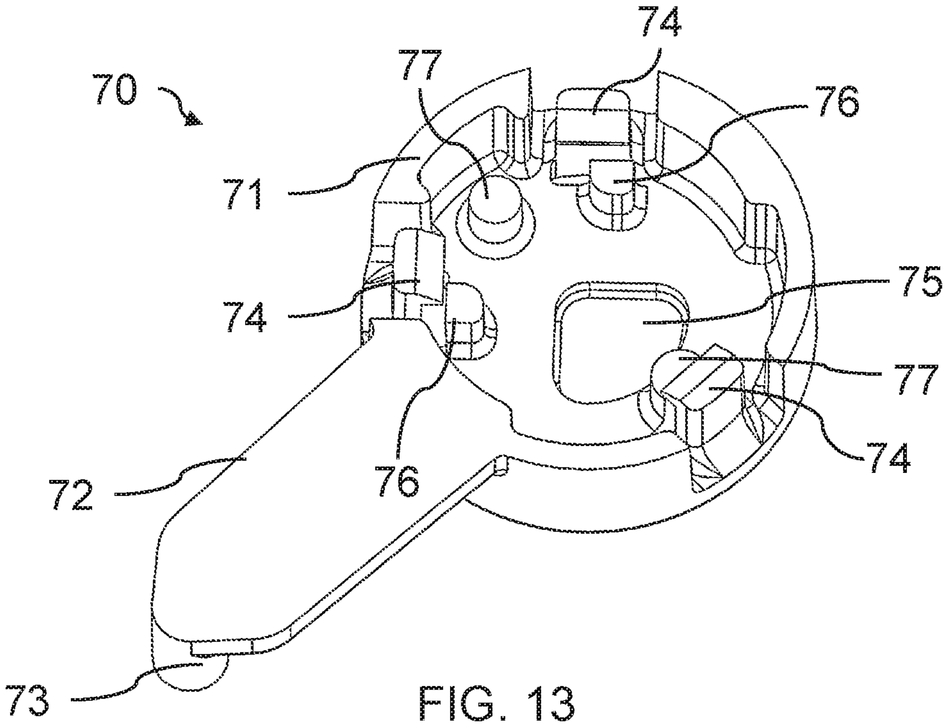
FIG. 13 is a perspective view of the cam coupling of FIG. 12.
Figure 14:
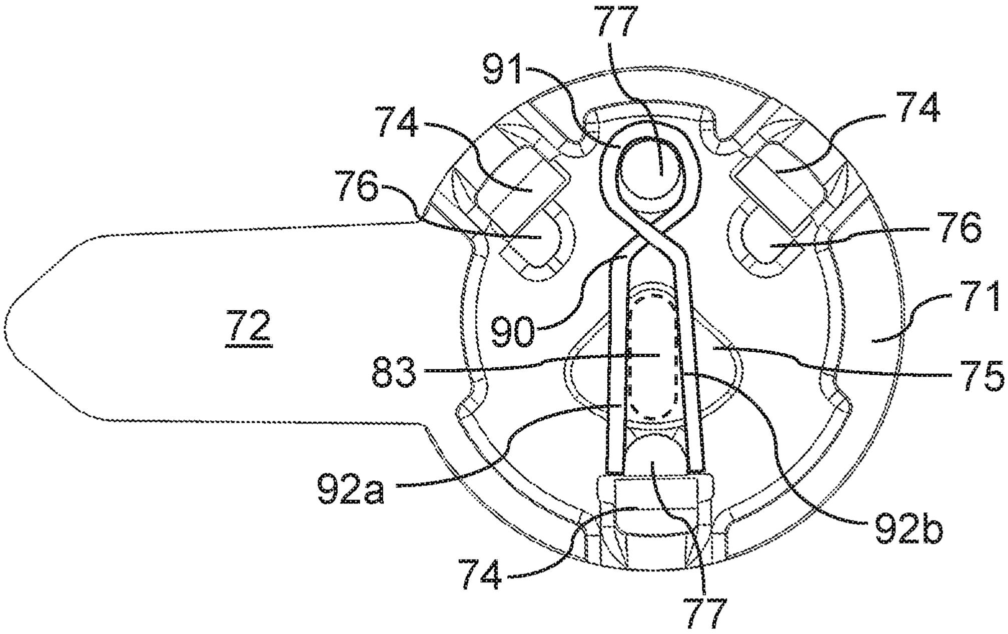
FIG. 14 is a top plan view of the cam coupling of FIG. 12 and one embodiment of a cam biasing element.

In some embodiments, it may be desirable to allow a locking mechanism to have greater rotational and/or linear ranges of motions so that one or more additional functions may be provided by turning a component of the locking mechanism (e.g., a thumb turn, lock cylinder, handle, etc.) attached to the locking mechanism coupler past a point corresponding to standard locked or unlocked states. For example, when unlocking a deadbolt, a key may be turned past a point where the deadbolt is unlocked to also retract a latch bolt. Accordingly, depending on a particular locking mechanism and/or status indicator, there may be instances where it may be desirable to move a locking mechanism coupler 80 in a greater range of rotational motion than that of a cam coupling 70, as shown in FIG. 12. That is, as the cam coupling may be connected to a status indicator plate and status indicator face, the rotational range of motion of the cam coupling may be limited by the linear range of motion of the status indicator plate and/or status indicator face. In such cases, it may be beneficial to provide a greater range of rotational motion for the locking mechanism coupler to avoid damage or degradation to the status indicator and/or allow a status indicator to be retrofit on locking mechanisms having different rotational ranges of motion. Accordingly, as shown in FIGS. 12-14, an engagement portion of the locking mechanism coupler is afforded an overrun rotational range of motion of ±45° (i.e., 90° total) relative to the neutral position of the engagement portion shown. That is, as the engagement portion is not rigidly connected to the cam coupling, the locking mechanism coupler may rotate independently against the resistance of a cam biasing element (see FIG. 14) until the engagement portion contacts a wall of an engagement portion receptacle (see FIGS. 13-14). Of course, while a ±45° range of the locking mechanism coupler is employed in the present embodiment, any suitable range may be employed, including, but not limited to, ±10°, ±30°, ±60°, ±75°, and ±90°.

FIG. 12 is a perspective exploded view of one embodiment of an overrunning cam coupling 70 and locking mechanism coupler 80, where the locking mechanism coupler is afforded a greater rotational range of motion to enable one or more functions of an associated locking mechanism (e.g., latch bolt retraction by turning a key past a position associated with an unlocked state of the locking mechanism). As shown in FIG. 12, the cam coupling includes a housing 71, a cam arm 72, a cam pin 73, and one or more retainers 74. The cam coupling is configured to receive the locking mechanism coupler and transmit rotational motion of an element of an associated locking mechanism into linear motion of a status indicator plate and status indicator face. That is, rotational force is transmitted through cam arm 72 and pin 73 to one or more slots on a status indicator plate, thereby converting the force into a linear force applied to the status indicator plate. The one or more retainers 74 are configured to retain the locking mechanism coupler 82 in the housing 71 and prevent relative linear movement of the cam coupling and the locking mechanism coupler. As shown in FIG. 12, the locking mechanism coupler includes a base 81, a shaft 82, and an engagement portion 83. The base 81 is configured to fit inside of the cam coupling housing 71 and be linearly retained by the one or more retainers 74. The shaft 82 is configured to engage one or more rotational components of a locking mechanism (for example, see FIGS. 15-16) so that rotational force may be transmitted through the shaft and engagement portion. The engagement portion 83 is configured to rotationally engage the cam coupling to transmit rotational force from the locking mechanism. According to the present embodiment, the engagement portion of FIG. 12 is configured to engage a torsion spring disposed in the cam coupling housing 71, as will be discussed further with reference to FIGS. 13-14. Of course, while a torsion spring is employed in the present embodiment, any suitable spring such as compression or extension springs may be employed.

FIG. 13 is a perspective view of the cam coupling 70 of FIG. 12 showing the inside of the housing 71. As shown in FIG. 13 and discussed previously, the cam coupling includes a cam arm 72, cam pin 73, and retainers 74. The cam coupling also includes standoffs 76 and biasing element mounts 77. The retainers are configured as hooks which retain a locking mechanism coupler inside the housing, holding the locking mechanism coupler against the standoffs and the biasing element mounts. The standoffs and biasing element mounts provide a low friction surface for a base (see FIG. 12) of locking mechanism coupler to rotate with low friction. The biasing element mounts are configured to receive a biasing element (e.g., a torsion spring) which is used to indirectly couple the rotational motion of the locking mechanism coupler to the cam coupling. As shown in FIG. 13, the cam coupling also includes an engagement portion receptacle 75 which at least partially defines a rotational range of motion of the locking mechanism coupler when disposed in the housing 71. According to the present embodiment, the engagement portion receptacle affords approximately 90° (i.e., ±45° from neutral) of added rotational range for the locking mechanism coupler, as will be discussed further with reference to FIG. 14. Of course, the engagement portion may afford larger or smaller rotational ranges for a locking mechanism coupler, as the present disclosure is not so limited.

FIG. 14 is a top plan view of the cam coupling 70 of FIG. 12 and one embodiment of a cam biasing element 90. For clarity, an engagement portion 83 of an associated locking mechanism coupler is shown in dashed lines disposed in the engagement portion receptacle 75. As discussed previously, in some cases it may be desirable to allow a lock cylinder or other component of a locking mechanism to move beyond positions associated with locked and unlocked states. For example, a lock cylinder may be overturned with a key or thumb turn after a deadbolt or handle is unlocked to retract a latch bolt. That is, when the key or thumb turn reaches an end of rotational travel for unlocking or locking a locking mechanism, it may be rotated even further to retract a latch bolt or perform another desirable function. Accordingly, the cam coupling and cam biasing element may allow for additional rotation of a locking mechanism component coupled to the engagement portion 83 of a locking mechanism coupler. As shown in FIG. 14, the cam biasing element is arranged as a torsion spring, with coil 91 disposed around one biasing element mount and a first leg 92*a* and second leg 92*b* disposed on opposite sides of another biasing element mount. In the present embodiment, the first leg and second leg are biased towards one another and apply a force into the biasing element mount around which they are disposed. The engagement portion 83 is disposed between the first leg and the second leg of the biasing element, such that rotation of the engagement portion relative to the cam coupling is resisted by the biasing element. That is, as the engagement is rotated, the first leg 92*a* and second leg 92*b* are spread apart from one another, the action of which is resisted by the biasing element. The force of rotation from the locking mechanism coupler is transmitted to the cam coupling via the biasing element mounts 77. The biasing element may have a suitable spring constant so that in normal operation the locking mechanism coupler and cam coupling have little relative movement to one another. Accordingly, the cam coupling and locking mechanism coupler may be used to move a status indicator face and/or plate to display various indicators corresponding to the state of the locking mechanism.

Figure 15:
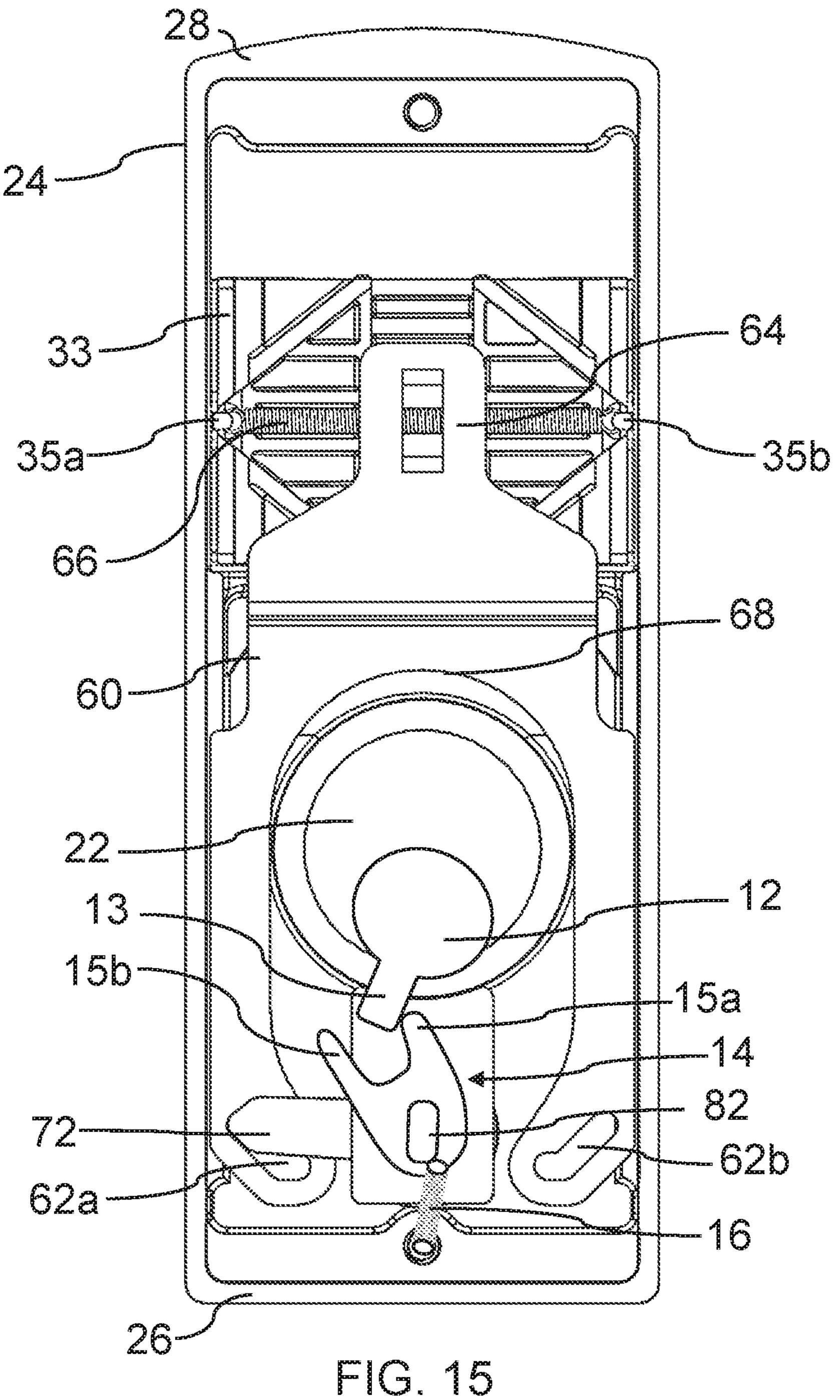
FIG. 15 is a rear elevation view of another embodiment of a status indicator and locking mechanism in an unlocked state.
Figure 15A:
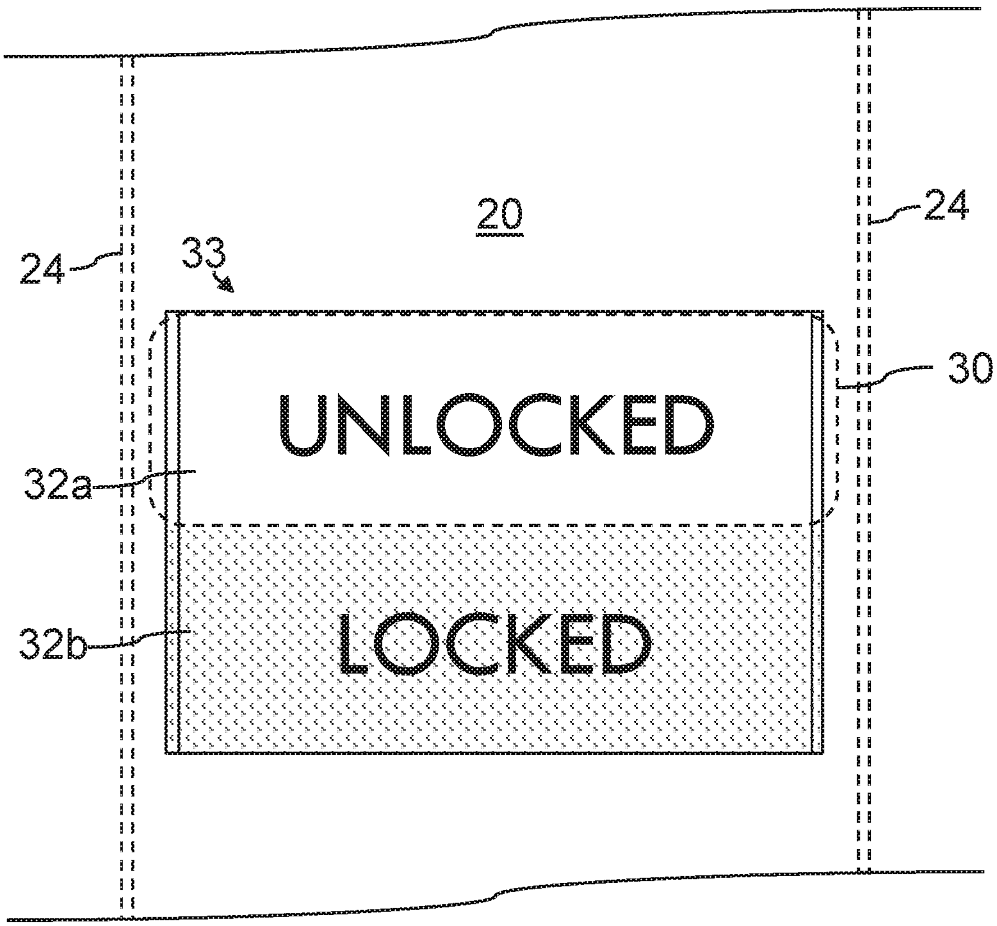
FIG. 15A is a front elevation view of the status indicator of FIG. 15 displaying an "UNLOCKED" indication.
Figure 16:
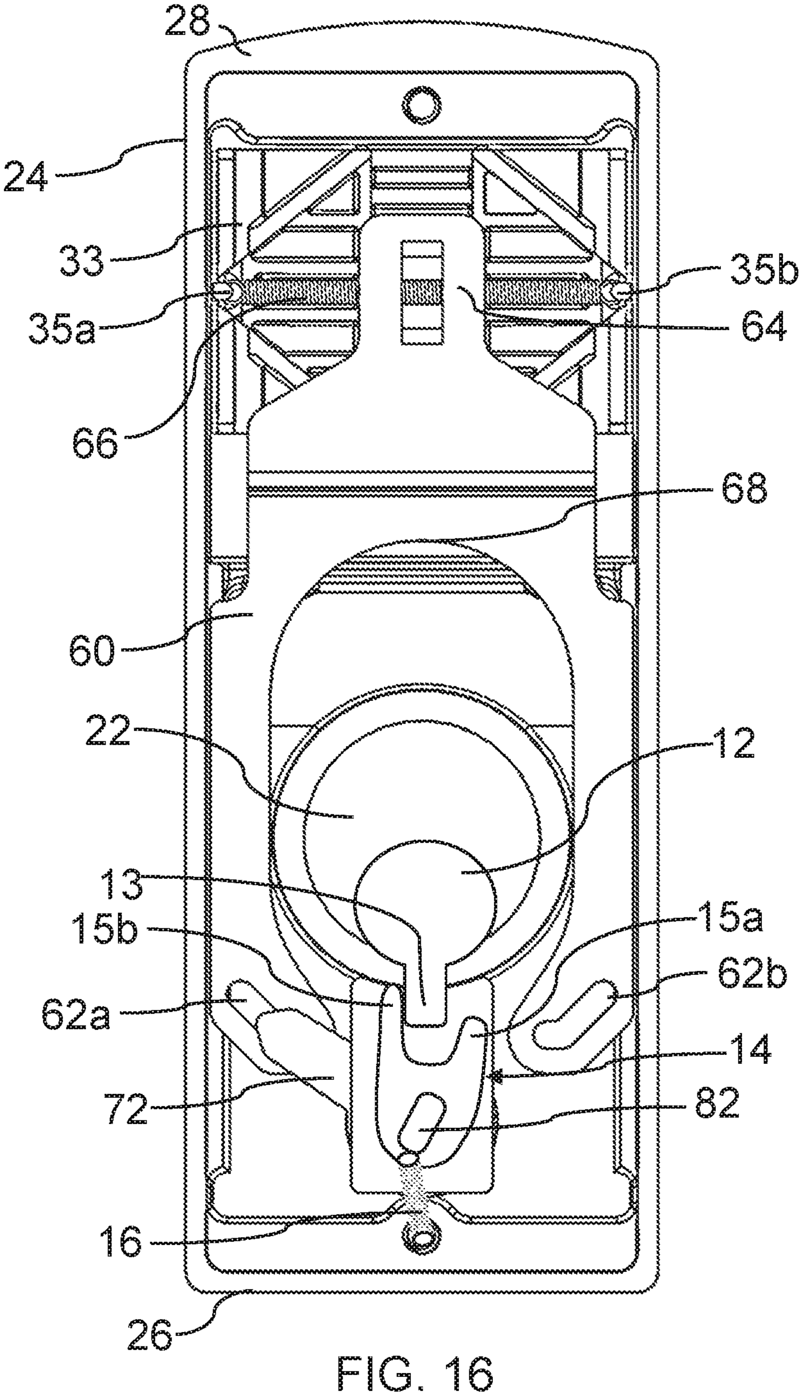
FIG. 16 is a rear elevation view of status indicator and locking mechanism of FIG. 15 in a locked state.
Figure 16A:
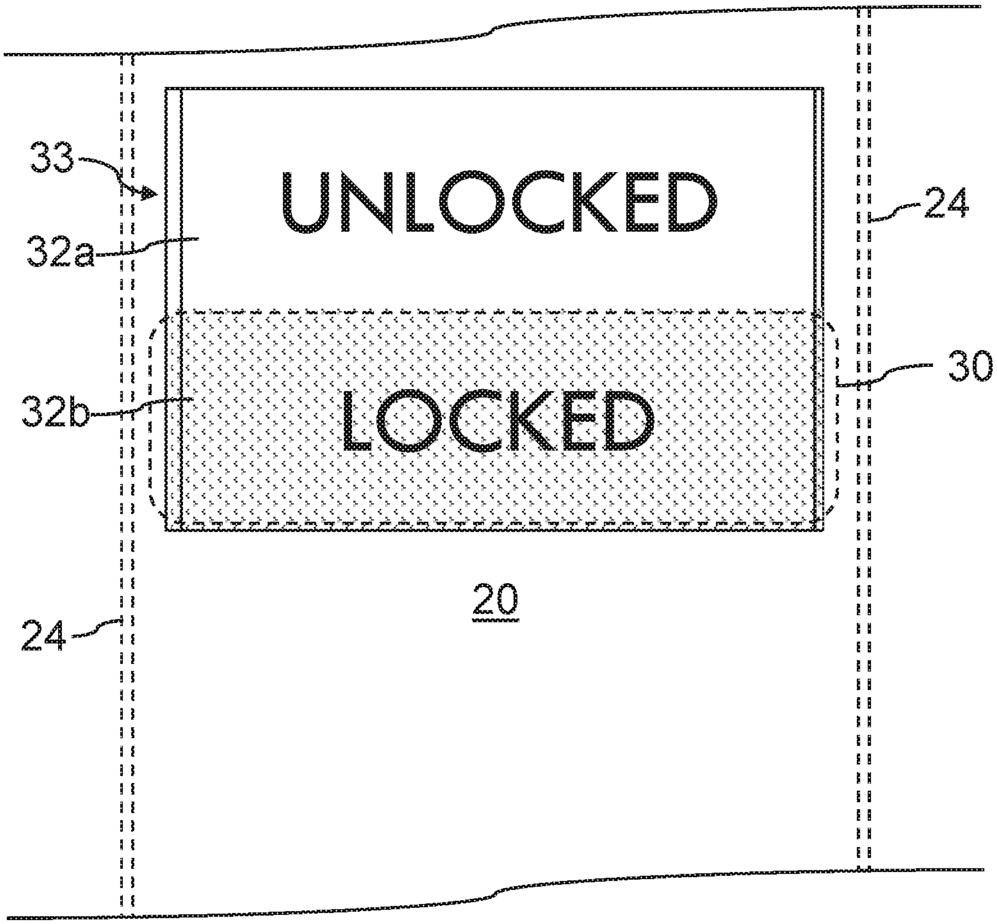
FIG. 16A is a front elevation view of the status indicator of FIG. 16 displaying a "LOCKED" indication.

FIGS. 15, 15A, 16, and 16A depict a status indicator 32 and a locking mechanism cooperating to change the indication displayed by a status indicator face 33. As noted previously, the status indicator and locking mechanism may be mechanically linked through any suitable arrangement, including cams, gear, linkages, springs, etc. The exemplary embodiment of FIGS. 15-16 depicts one arrangement for a mechanical interface between a lock cylinder 22 and the status indicator. The mechanical interface of FIGS. 15-16 is arranged as a biased locking mechanism cam which allows the status indicator to be reliably switched between displayed indications, as shown in FIGS. 15A and 16A. Of course, any suitable mechanism interface between a locking mechanism and a status indicator may be employed, as the present disclosure is not so limited.

FIG. 15 is a rear elevation view of another embodiment of a status indicator 32 displaying an “UNLOCKED” indication (see FIG. 15A) according to a locking mechanism in an unlocked state. According to this embodiment and as shown in in the front elevation view of FIG. 15A, a top portion of the status indicator face 33 includes the “UNLOCKED” indication 32*a* and is aligned with an indicator window 30 when the status indicator is in the position shown in FIG. 15. As shown in FIG. 15, the lock cylinder 22 may be coupled to the status indicator via a pin cam 12 and a locking mechanism cam 14. The pin cam 12 is configured to rotate 360 degrees when a correct key is inserted into the lock cylinder, and a pin cam engagement portion 13 may be used to manipulate the state of the locking mechanism cam 14. The locking mechanism cam includes a first arm 15*a* and a second arm 15*b* which each engage the pin cam 12 in different states of the locking mechanism. The locking mechanism cam 14 may interact with one or more components of a locking mechanism. For example, the locking mechanism cam may lock or unlock an exterior handle, lock or unlock a deadbolt, lock or unlock a latch bolt, and/or perform other desirable functions. The locking mechanism cam is also configured to switch the indicator state to display different indications according to the different functions controlled by transmitting rotational motion to the shaft 82 of the locking mechanism coupler. As shown in FIG. 15, the locking mechanism cam is shown with an exemplary over-center spring 16 which is used to selectively bias the locking mechanism cam between two different states, as will be discussed further below. Of course, it should be noted that any suitable spring or spring combination may be used to bias the locking mechanism cam directly or indirectly in any suitable direction, as the present disclosure is not so limited.

According to the state shown in FIG. 15, the over-center spring 16 (arranged as a compression spring) is biasing the locking mechanism cam 14 to rotate in a counter-clockwise direction relative to the page. Correspondingly, the cam arm 72 of the cam coupling has rotated in a counter-clockwise direction relative to the page and has moved the status indicator plate 60 and status indicator face 33 down relative to the page via the first cam slot 62*a*. For clarity, the pin cam engagement portion 13 remains in contact with the first arm 15*a* of the locking mechanism cam as if the pin cam were about to be used to switch the state of the locking mechanism from an unlocked state to a locked state. That is, in the unlocked state shown, the pin cam 12 may be in or out of contact with the locking mechanism cam while the locking mechanism remains in the unlocked state. From the position shown in FIG. 15, the pin cam 12 may be rotated by a key in a counter-clockwise direction to apply a force to the first arm 15*a* opposing the biasing force from the over-center spring 16. As the pin cam applies force to the first arm, the locking mechanism cam may be rotated in a clockwise direction relative to the page to the state shown in FIG. 16.

FIG. 16 is a rear elevation view of status indicator 32 of FIG. 15 displaying a “LOCKED” indication (see FIG. 16A) with the locking mechanism in a correspondingly locked state. According to this embodiment and as shown in the front elevation view of FIG. 16A, a bottom portion of the status indicator face 33 includes the “LOCKED” indication 32*b* and is aligned with an indicator window 30 when the status indicator is in the position shown in FIG. 16. Compared with FIG. 15, the status indicator face 33, status indicator plate 60, cam arm 72, pin cam 12, locking mechanism cam 14, and shaft 82 of the locking mechanism coupler have all moved to new positions. More specifically, the status indicator face and status indicator plate have moved along a longitudinal axis of the status indicator (i.e., up relative to the page). The cam arm of the cam coupling has correspondingly rotated clockwise relative to the page and has transmitted the rotary motion into linear motion of the status indicator plate via first cam slot 62*a*. The locking mechanism cam 14 and coupled shaft 82 of the locking mechanism coupler have been rotated clockwise by the pin cam engagement portion 13 until the biasing force applied by the over-center spring 16 was applied to a different side of the geometric center of the locking mechanism cam, such that the direction of force applied to the locking mechanism cam switched (i.e., a torque is applied in an opposite direction to that of FIG. 15 which is clockwise relative to the page). Accordingly, the second arm 15*b* of the locking mechanism cam is brought into contact with the pin cam engagement portion 13. Similarly to the state of FIG. 16, the pin cam may be freely rotated in a counter-clockwise direction (e.g., to free the key) and the locking mechanism may remain in a locked state. In some embodiments other components of the locking hardware may restrict and/or modify the motion of the locking mechanism cam, such as restricting the rotational range of motion of the locking mechanism cam.

It should be noted that the embodiment shown in FIGS. 15-16 depicts simplified, exemplary components of a locking mechanism. The status indicator may be manipulated through any appropriate locking mechanism which operates through any combination of rotational and/or linear motions and may employ camming elements, gears, biasing elements, levers, and/or other suitable components for a particular locking application. Similarly, in some embodiments, the movement directions noted with reference to FIGS. 15-16 may be reversed in whole or in part.

Figure 17:
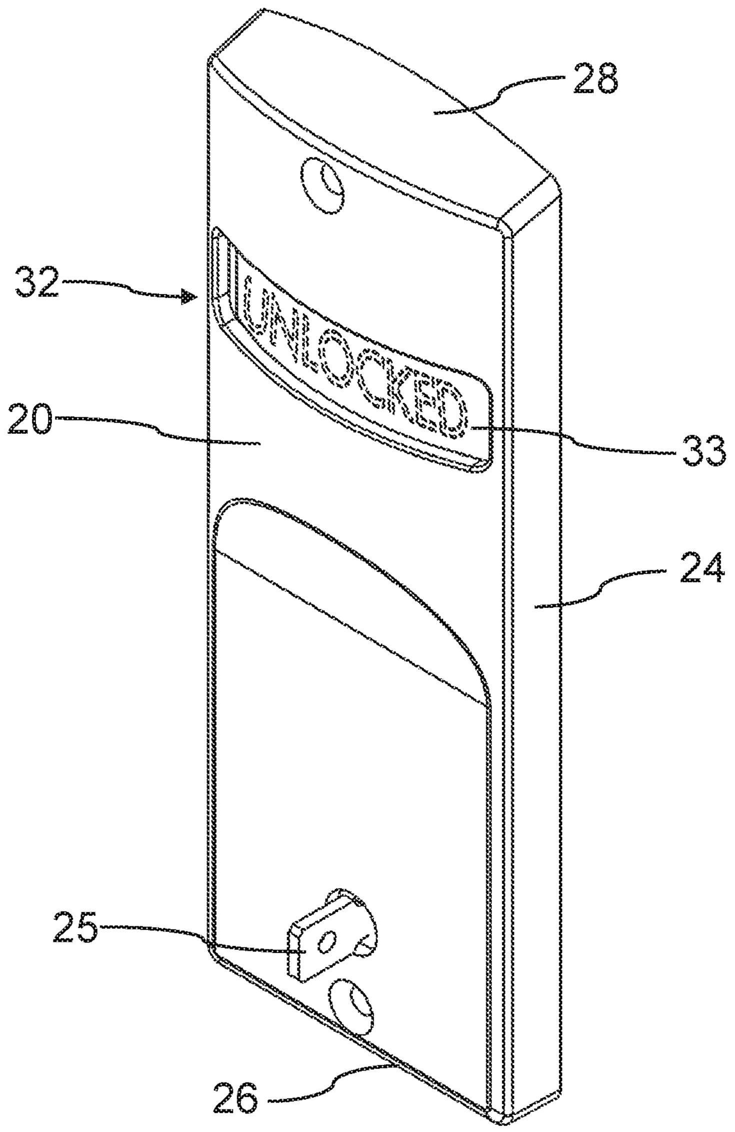
FIG. 17 is a perspective view of yet another embodiment of a locking mechanism and status indicator.

FIG. 17 is a perspective view of yet another embodiment of a locking mechanism and status indicator 32. The embodiment of FIG. 17 is similar to that of FIGS. 9-10, except that instead of a lock cylinder the status indicator is manipulated with a thumb turn 25. The thumb turn may be coupled to a suitable handle or knob so that the thumb turn may be rotated by an operators' hand to change the state of the locking mechanism and status indicator.

In some embodiments, method for operating a status indictor for a locking mechanism includes displaying an unlocked indication when the locking mechanism is in an unlocked state. For example, the unlocked indication may be displayed by a status indicator visible through an indicator window formed in an escutcheon plate and/or by an extension which projects out from the escutcheon plate. In some embodiments, the escutcheon plate includes at least two radii of curvature so that the status indicator is visible from a wide viewing angle (e.g., greater than or equal to 180°). The method may also include changing a state of the locking mechanism from the unlocked state to a locked state. For example, a key, thumb turn, push switch, or other component may be used to unlock the locking mechanism. The method may also include displaying a locked indication when the locking mechanism is in the locked state. The locked indication may also be displayed by a status indicator visible through an indicator window formed in an escutcheon plate and/or by an extension which projects out from the escutcheon plate. The method may be reversed and repeated for changing the locking mechanism between the unlocked and locked states.

The foregoing embodiments of the status indicator and locking mechanism include various features, each of which have been described in detail above. It should be appreciated that these described features may be employed singularly or in any suitable combination.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A status indicator assembly for a locking mechanism, the locking mechanism moveable between a locked state and an unlocked state, the locking mechanism coupled to an actuation mechanism, the actuation mechanism operatively coupled to the status indicator such that movement of the locking mechanism moves the status indicator, the status indicator assembly comprising:

an escutcheon plate having a curved front face portion, wherein the curvature of the front face portion includes at least two radii of curvature;

an indicator window disposed on the front face portion of the escutcheon plate;

a status indicator having a status indicator plate and a status indicator face, the status indicator operatively couplable to the locking mechanism, the status indicator disposed behind the escutcheon plate and visible through the indicator window, wherein the status indicator displays a locked indication when the locking mechanism is in the locked state, and wherein the status indicator displays an unlocked indication when the locking mechanism is in the unlocked state, and wherein the curvature of the of the front face portion allows the front face portion to be visible through the indicator window from a viewing angle greater than or equal to 180 degrees; and a biasing element configured to couple the status indicator face to the status indicator plate, wherein the biasing element allows the status indicator face to be moved independently relative to the status indicator plate.

2. The status indicator of claim 1, wherein the status indicator is configured to extend from the escutcheon plate when the locking mechanism is in the locked state, and wherein the status indicator is configured to retract into the escutcheon plate when the locking mechanism is in the unlocked state.

3. The status indicator of claim 2, wherein the status indicator extends and retracts along a longitudinal axis of the escutcheon plate.

4. The status indicator of claim 1, wherein the locked indication and/or unlocked indication includes a retroreflective coating.

5. The status indicator of claim 1, wherein the status indicator is curved in conformity with the front face portion of the escutcheon plate and includes the at least two radii of curvature.

6. The status indicator of claim 1, wherein the curvature of the of the front face portion allows the front face portion to be visible through the same indicator window from a viewing angle greater than or equal to 180 degrees.

7. A method of indicating a locking state of a locking mechanism, the locking mechanism moveable between a locked state and an unlocked state, the locking mechanism coupled to an actuation mechanism, the actuation mechanism operatively coupled to a status indicator such that movement of the locking mechanism moves the status indicator, the method comprising:

displaying an unlocked indication when the locking mechanism is in an unlocked state, wherein the unlocked indication is displayed by a status indicator operatively couplable to the locking mechanism, the status indicator visible through an indicator window formed in an escutcheon plate, and wherein the escutcheon plate includes at least two radii of curvature;

changing a state of the locking mechanism from the unlocked state to a locked state;

displaying a locked indication when the locking mechanism is in the locked state, wherein the locked indication is displayed by the status indicator visible through the indicator window; and providing a biasing element to couple a status indicator face of the status indicator to a status indicator plate of the status indicator, wherein the biasing element allows the status indicator face to be moved independently relative to the status indicator plate.

8. The method of claim 7, further comprising displaying the status indicator at a viewing angle greater than 180 degrees through the same indicator window.

9. The method of claim 7, further comprising extending the status indicator out of the escutcheon plate when the locking mechanism is changed to the locked state.

10. The method of claim 9, further comprising retracting the status indicator when the locking mechanism is changed to the unlocked state.

11. The method of claim 7, wherein extending and retracting the status indicator comprises moving the status indicator along a longitudinal axis of the escutcheon plate.

12. The method of claim 7, further comprising reflecting light incident on the status indicator when the locked indication and/or unlocked indication are displayed.

13. The method of claim 7, further comprising curving the status indicator in conformity with a front face portion of the escutcheon plate so that the status indicator includes the at least two radii of curvature.

14. A status indicator for a locking mechanism, the locking mechanism moveable between a locked state and an unlocked state, the locking mechanism coupled to an actuation mechanism, the actuation mechanism operatively coupled to the status indicator such that movement of the locking mechanism moves the status indicator, the status indicator comprising:

a status indicator face including a locked indication and an unlocked indication;

a status indicator plate operatively coupled to the locking mechanism, wherein the status indicator plate is configured to move the status indicator face to display the locked indication when the locking mechanism is in the locked state, and wherein the status indicator plate is configured to move the status indicator face to display the unlocked indication when the locking mechanism is in the unlocked state; and a biasing element configured to couple the status indicator face to the status indicator plate, wherein the biasing element allows the status indicator face to be moved independently relative to the status indicator plate.

15. The status indicator of claim 14, wherein the biasing element is an extension spring.

16. The status indicator of claim 14, wherein the status indicator face and the status indicator plate are configured to move along a longitudinal axis of the locking mechanism.

17. The status indicator of claim 16, wherein the status indicator is coupled to the locking mechanism with a cam coupling and locking mechanism coupler, wherein rotation of the locking mechanism coupler moves the status indicator plate along the longitudinal axis.

18. The status indicator of claim 17, wherein the cam coupling includes a cam biasing member, and wherein a rotational range of motion of the locking mechanism coupler is greater than a cam coupling rotational range of motion.

* * * * *